Patented May 17, 1949

2,470,703

UNITED STATES PATENT OFFICE 2,470,703

METHOD FOR OBTAINING FAT-SOLUBLE VITAMIN-CONTAINING MATERIALS IN OIL

Charles J. Kern, Long Island City, and Joseph M. Tabor, East Islip, N. Y., assignors to American Home Products Corporation, New York, N. Y., a corporation of Delaware No Drawing. Application November 20, 1946, Serial No. 711,208

7 Claims. (Cl. 167—81)

This invention relates to a method for obtaining fat-soluble, vitamin-containing materials in oil and more specifically relates to a method for obtaining increased yields of fat-soluble, vitamin-containing solutions which are highly stable.

It is known that vitamin-containing materials may be obtained from fish and animal oils in various amounts depending on the source and the method of extraction employed. It is also known that fish liver oils are particularly rich in vitamins A and D and a great many methods have been employed in an effort to extract the maximum amounts of these vitamins. From an economic standpoint, extractive methods which improve yields even by a few percent are highly desirable in commercial practice since the source material is relatively expensive and at periodic intervals difficultly procurable.

The methods in general use involve primarily a saponification of saponifiable fractions and a solvent extraction of the mass. The solvent extracts the valuable fat-soluble vitamin-containing material present in the saponified mass. A process representative of the prior art is the Marcus Patent 1,690,091, dated October 30, 1928, which discloses one procedure followed in commercial practice up to the present time. This process relies primarily on an ethylene dichloride extraction of a mass of vitamin-containing material which had been saponified by alcoholic potash. This particular process is mentioned because it results in a fairly good yield of vitamin concentrate. The process of this invention is markedly superior in that surprisingly higher yield of vitamin-containing material, with less equipment and fewer steps can be obtained by this invention.

The process briefly involves treating a saponified mass of vitamin-containing material with a mixture of a fatty material and a solvent. As a further feature, the fatty material may contain natural antioxidants or added antioxidants. The process results in a final product comprising vitamin concentrate and an oil carrier, and if desired, an antioxidant material in addition.

In more detail, the process involves saponification of vitamin-containing oil from animal or fish origin in a saponification vessel, this step being carried out by the use of alcohol and a caustic. The mixture is agitated until saponification is complete and after the contents of the vessel are permitted to cool sufficient water is added to form a viscous soap mass.

To the saponification vessel is now added a mixture of oil and solvent and the mixture is further agitated. The extract is drawn off and further extractions are carried out with the same mixture in order to remove substantially all of the vitamin concentrate. The extracts are combined and the solvent is distilled off, leaving the vitamin concentrate in solution in the oil.

The alcohol used in the saponification step may be any of the lower boiling alcohols such as aqueous methyl, ethyl or isopropyl alcohol. The concentration of the alcohol can be varied within wide limits ranging from 3 to 60% aqueous alcohol although 25 to 50 aqueous alcohol is preferred. About 0.5 to 5% by weight of alcohol, based on the oil used has been found practical.

The caustic may be sodium or potassium hydroxide although potassium hydroxide is preferred. The amount of caustic used is calculated to provide an excess of about 10 to 25 percent in order to make certain that saponification is complete.

The solvent used for extracting or washing the active principles from the unsaponified and difficulty saponifiable fractions may be any well-known solvent in which the fat-soluble vitamins are soluble and having the further characteristic that it must form a clearly defined and easily separable layer in the saponification vessel. There are numerous solvents that can be successfully used among which may be mentioned carbon disulfide, carbon tetrachloride, trichlorethylene, ethylene dichloride, methylene chloride, etc., although the preferred solvent is ethylene dichloride.

One part of material treated by weight to 3 to 5 parts of solvent by weight constitutes the most economical ratios to be used in the first wash or extraction. If lesser quantities are used the recoveries are undesirably low and if greater quantities are used no appreciable increase in the volume of the draw-off is obtained. The amount withdrawn is of course controlled by the amount of solvent which can be practicably removed from the separated layers. The amount of solvent added in the remaining washes is controlled by the amount previously separated. Thus if 250 gallons of extract is withdrawn after a wash, approximately 250 gallons is added for the next wash.

The fatty material used together with the solvent for extracting the vitamin content from the saponified fish liver oil mass may be either a mineral oil or a vegetable oil, the latter being preferred.

The vegetable oil which may be employed together with the solvent, in accordance with the process of my invention, may be any vegetable oil, either crude or refined or fractionated products resulting from chemical or physical treatment of such oils or may be a mixture of such oils. Among those oils which may be used may be mentioned corn oil, soya bean oil, linseed oil, peanut oil, wheat oil, rye oil, oat oil, rice oil, palm oil, cocoanut oil, olive oil, cottonseed oil, flax seed oil, poppy seed oil, mustard seed oil, rape seed oil, sunflower seed oil, tomato seed oil, sesame oil, perilla oil, alfalfa seed oil, wheat germ oil, corn germ oil, rice germ oil, etc. As stated before either a treated oil, refined oil or crude oil may be used although a crude or semi-refined vegetable oil is preferred since these contain natural antioxidants which remain with the vitamin content and prevent rapid deterioration of the active principles.

While any of the above-mentioned vegetable oils may be used singly or in combination, together with the selected solvent, it is also to be noted that mineral oil may be used in lieu of vegetable oil or a mixture of vegetable oils. A preferred mineral oil is the medicinal type although generally, any mineral oil having a viscosity of about 100 to 300 seconds Saybolt Universal may be used with the solvent.

It has been found experimentally that the amount of oil necessary to secure effective results should fall within the range of about .05% to 5% by weight of the solvent used. Quantities above 5% are undesirable as the concentrate secured by such a process is diluted beyond practical values.

Whether vegetable or mineral oil is selected for admixture with the solvent, the combination of both oil and solvent has been found to be far more efficient than solvent alone for extraction of the fat-soluble vitamins from the saponified mass. It should be noted that the oil added to the solvent passes through the saponified mass unchanged even though excess alkali is present since 100% recoveries of oil have been obtained.

As already pointed out, if a vegetable oil is selected as the fatty material used in conjunction with the solvent, the oil may be so selected as to possess antioxidant activity due to the natural antioxidants in the oil itself. In the event that full oxidation protection is desired during processing and in the final product and the oil selected does not possess antioxidant activity or an adequate amount for protection, antioxidants may be added to the mixture of oil and solvent. Any well-known antioxidant or mixture having an antioxidant effect may thus be added together with the oil and as examples, lecithin, ascorbic acid, tocopherol scums, or synergistic combinations such as lecithin and ascorbic acid may be used.

The following examples are given for a more complete understanding of the invention, but it is to be understood that these examples are merely for illustrative purposes and the invention is not intended to be limited thereto.

*Example I*

1350 pounds of shark liver oil were added to a saponification vessel and heated to 68° C. To the oil was added 3 gallons of 50% ethyl alcohol and the mixture was vigorously agitated. 50.5 gallons of 40% aqueous caustic potash were then added with continued agitation, the temperature being permitted to rise spontaneously until maximum is reached (approx. 85° C.). Agitation was then discontinued and the mass was permitted to cool for one hour with cold water circulating through the jacket. Agitation was resumed and 20 gallons of water were added thus forming a viscous soap mass. 500 gallons of ethylene dichloride were then added to the soap mass and agitated thoroughly for approximately 30 minutes. The mixture was then allowed to separate and the clear extract was drawn off. Six additional washes of ethylene dichloride were added to the soap mixture and the extracts were drawn off, as before. The amounts of solvent added and withdrawn in the extraction procedure were as follows:

| No. of washes | Solvent, in gallons | |
|---|---|---|
| | Added | Withdrawn |
| 1 | 500 | 200 |
| 2 | 200 | 190 |
| 3 | 190 | 175 |
| 4 | 175 | 190 |
| 5 | 190 | 190 |
| 6 | 190 | 135 |
| 7 | 135 | 140 |

The extracts were combined, filtered and distilled under vacuum. The yield of vitamin A concentrate was 78% of the original vitamin A in the starting material as determined by spectographic analysis.

The original vitamin A potency was determined by well known methods known to the art using a quartz spectograph and an extinction coefficient at 3280 Angstrom. The figure obtained was a measure of the vitamin A potency and was checked by means of the Carr-Price antimony trichloride colorimetric assay.

*Example II*

The same procedure was carried out as indicated in Example I, except that in place of ethylene dichloride alone, all the extractions were carried out using about 0.1% by weight of cottonseed oil based on the solvent. The first wash consisted of 500 gallons of ethylene dichloride in which 5 pounds of cottonseed oil had been dissolved. The amounts of solvent and cottonseed oil added and withdrawn in the extraction procedure were as follows:

| No. of washes | Solvent with 0.1% by weight of cottonseed oil, in gallons | |
|---|---|---|
| | Added | Withdrawn |
| 1 | 500.6 | 240 |
| 2 | 240 | 235 |
| 3 | 235 | 220 |
| 4 | 220 | 235 |
| 5 | 235 | 250 |
| 6 | 250 | 250 |
| 7 | 250 | 260 |

The extracts were combined, filtered and distilled under vacuum as described in Example I. The yield of vitamin A concentrate was 91.9% of the original vitamin A in the starting material.

*Example III*

The same procedure was carried out as indicated in Example I, except that in place of ethylene dichloride alone, the extractions were carried out using about 1.0% by weight of cottonseed oil based on the solvent. The first wash consisted of 500 gallons of ethylene dichloride in which 52.5 pounds of cottonseed oil had been dissolved. The amounts of solvent and cottonseed oil added and withdrawn in the extraction procedure were as follows:

| No. of washes | Solvent with 0.1% by weight of cottonseed oil, in gallons | |
|---|---|---|
| | Added | Withdrawn |
| 1 | 506.9 | 250 |
| 2 | 250 | 230 |
| 3 | 230 | 230 |
| 4 | 230 | 225 |
| 5 | 225 | 260 |
| 6 | 260 | 250 |
| 7 | 250 | 240 |

The extracts were combined, filtered and distilled under vacuum as indicated in Example I. The yield of vitamin A concentrate was 90% of the original vitamin A in the starting material.

*Example IV*

The same procedure was carried out as indicated in Example I, except that cod liver oil was used instead of shark liver oil and in place of ethylene dichloride alone, the extractions were carried out using about 3% by weight of cottonseed oil, based on the solvent. The first wash consisted of 500 gallons of ethylene dichloride in which 157.5 pounds of cottonseed oil had been dissolved. The amounts of solvent and cottonseed oil added and withdrawn in the extraction procedure were as follows:

| No. of washes | Solvent with 3% by weight of cottonseed oil, in gallons | |
|---|---|---|
| | Added | Withdrawn |
| 1 | 520.7 | 250 |
| 2 | 250 | 220 |
| 3 | 220 | 240 |
| 4 | 240 | 240 |
| 5 | 240 | 230 |
| 6 | 230 | 250 |
| 7 | 250 | 240 |

The extracts were combined, filtered and distilled under vacuum as indicated in Example I. The yield of vitamin A concentrate was 92% of the original vitamin A in the starting material.

*Example V*

500 grams of shark liver oil were heated in a beaker to 70° C. 10 cc. of 50% ethanol was added and the mixture agitated vigorously. 200 grams of a 40% aqueous potassium hydroxide solution were added with continued agitation, temperature being permitted to rise spontaneously until the maximum was reached (approximately 85° C.). Agitation then was discontinued and the mass permitted to cool. Agitation was resumed after one hour and 60 grams of water was added thus forming a viscous soap mass. 1500 cc. of ethylene dichloride in which 1.5 grams of oil press cake (derived from the cold pressing of crude wheat germ oil) had been dissolved was then added to the soap mass and agitated thoroughly for approximately 30 minutes. The mixture was allowed to separate and the clear extract was drawn off. Additional washes of ethylene dichloride and the same percentage by weight of oil press cake were subsequently added and drawn off as before. The extracts were combined, filtered and distilled under vacuum. The final product was a vitamin A concentrate containing oil press cake. The yield of vitamin A was determined by means of spectrographic analysis to be 89.9% of that contained in the original oil.

*Example VI*

500 grams of cod liver oil were heated in a beaker to 70° C. 10 cc. of 50% ethanol was added and the mixture agitated vigorously. 200 grams of a 40% aqueous potassium hydroxide solution were added with continued agitation, temperature being permitted to rise spontaneously until the maximum was reached (approximately 83° C). Agitation was then discontinued and the mass permitted to cool. Agitation was resumed after one hour and 60 grams of water was added thus forming a viscous soap mass. 1500 cc. of ethylene dichloride in which two cc. of refined white mineral oil had been dissolved were then added to the soap mass and agitated thoroughly for approximately 30 minutes. The mixture was allowed to separate and the clear extract was drawn off. Additional washes of ethylene dichloride and the same percentage by weight of mineral oil were subsequently added and drawn off as before. The extracts were combined, filtered and distilled under vacuum. The final product was a vitamin A concentrate in mineral oil. The yield of vitamin A was determined by means of spectrographic analysis to be 86.4% of that contained in the original oil.

*Example VII*

500 grams of cod liver oil were heated in a beaker to 70° C. 10 cc. of 50% ethanol were added and the mixture agitated vigorously. 200 grams of a 40% aqueous potassium hydroxide solution were added with continued agitation, temperature being permitted to rise spontaneously until the maximum was reached (approximately 83° C.). Agitation was then discontinued and the mass permitted to cool. Agitation was resumed after one hour and 60 grams of water was added thus forming a viscous soap mass. 1500 cc. of ethylene dichloride to which 1.5 cc. cottonseed oil and .5 gram of ascorbic acid has been added were then added to the soap mass and agitated thoroughly for approximately 30 minutes. The mixture was allowed to separate and the clear extract was drawn off. Additional washes of ethylene dichloride, and the same percentages by weight of cottonseed oil and ascorbic acid mixture were subsequently added and drawn off as before. The extracts were combined, filtered and distilled under vacuum. The final product was a vitamin A concentrate in cottonseed oil. The yield of vitamin A was determined by means of spectrographic analysis to be 90.8% of that contained in the original oil.

A study of the examples indicate that increased yields amounting to as high as about 15% is achieved by the use of an oil mixed with the solvent.

While the above examples were carried out with various shark liver and cod liver oils for illustrative purposes, improved yields can be obtained with fat-soluble, vitamin-containing oils from any source whether of fish or animal origin. Thus, improved yields of vitamins A, D, E or K or any fat-soluble growth accessory factors may be obtained from the lipoid fraction of mammalian livers in general as for example from hog and beef livers and from marine sources, as for example, whale liver oil, cod liver oil, shark liver oil, halibut liver oil, seal liver oil, porpoise liver oil, tuna liver oil, swordfish liver oil and similar sources.

We claim:

1. The process of treating a vitamin-rich material selected from the group consisting of fish and animal oils to extract its vitamin content and to obtain a highly potent concentrate comprising saponifying said vitamin-rich material and extracting the vitamin content with a mixture of a chlorinated hydrocarbon solvent and about 0.05% to 5% by weight, based on solvent of an oil selected from the group consisting of mineral and vegetable oils.

2. The process of claim 1; wherein the chlorinated hydrocarbon solvent is ethylene dichloride.

3. The process of treating a vitamin-containing oil selected from the group consisting of fish and animal oils to extract its vitamin content and to obtain a highly potent concentrate therefrom comprising saponifying the oil and extracting the vitamin content with a mixture comprising an organic solvent in which fat-soluble vitamins are soluble and an oil selected from the group consisting of vegetable and mineral oil, the oil in said mixture being present to the extent of about 0.05% to 5% by weight of said solvent.

4. The process of treating a vitamin-containing oil selected from the group consisting of fish and animal oils to obtain a vitamin concentrate of high potency therefrom, comprising contacting a saponified mass of said vitamin-containing oil with a mixture comprising mineral oil and an organic solvent in which fat-soluble vitamins are soluble, the oil in said mixture being present to the extent of about 0.05% to 5% by weight of said solvent.

5. The process of treating a vitamin-containing oil selected from the group consisting of fish and animal oils to obtain a fat-soluble vitamin concentrate of high potency therefrom, comprising contacting a saponified mass of said vitamin-containing oil with a mixture comprising vegetable oil and an organic solvent in which fat-soluble vitamins are soluble, the oil in said mixture being present to the extent of about 0.05% to 5% by weight of said solvent.

6. The process of claim 5; wherein the vegetable oil is cottonseed oil.

7. A process for obtaining high yields of fat-soluble vitamin concentrate of high stability from vitamin-containing oil selected from the group consisting of fish and animal oils comprising extracting a saponified mass of said vitamin-containing oil with a mixture of an organic solvent in which fat-soluble vitamins are soluble and vegetable oil, said mixture containing antioxidant material and said vegetable oil in said mixture being present to the extent of about 0.05% to 5% by weight of said solvent.

CHARLES J. KERN.
JOSEPH M. TABOR.

REFERENCES CITED

The following references are of record in the file of this patent:

UNITED STATES PATENTS

| Number | Name | Date |
|---|---|---|
| 1,629,618 | Gronningsaeter | May 24, 1927 |
| 1,935,042 | Black | Nov. 14, 1933 |
| 1,983,654 | Black | Dec. 11, 1934 |
| 2,266,830 | Taylor | Dec. 23, 1941 |
| 2,389,955 | Buxton | Nov. 27, 1945 |

FOREIGN PATENTS

| Number | Country | Date |
|---|---|---|
| 243,907 | Great Britain | Dec. 10, 1925 |
| 280,212 | Great Britain | May 11, 1928 |
| 305,929 | Great Britain | Feb. 9, 1929 |